March 13, 1928.  1,662,661
A. F. COATES
CONTROL MECHANISM
Filed Aug. 17, 1926  4 Sheets-Sheet 1
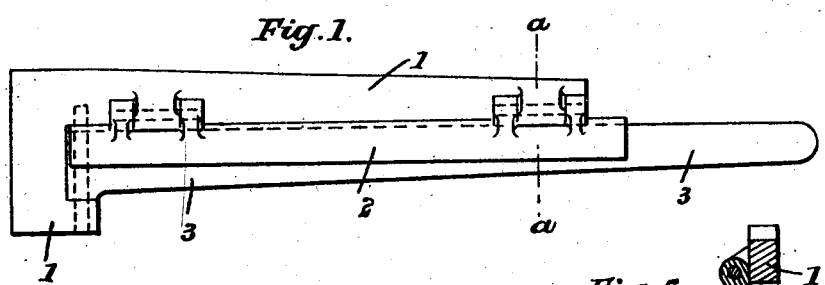
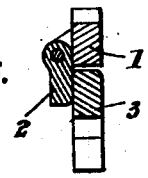
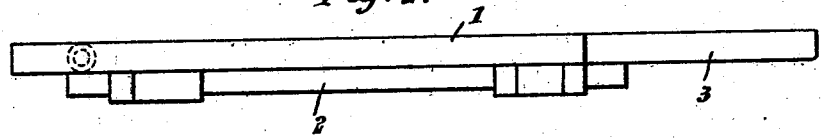
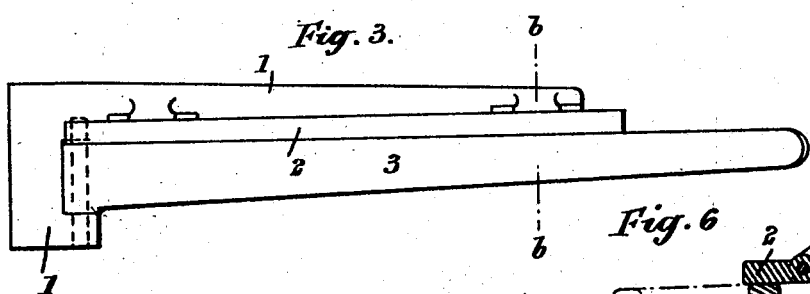
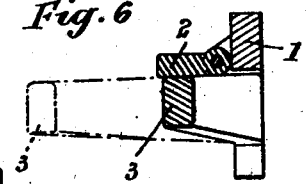
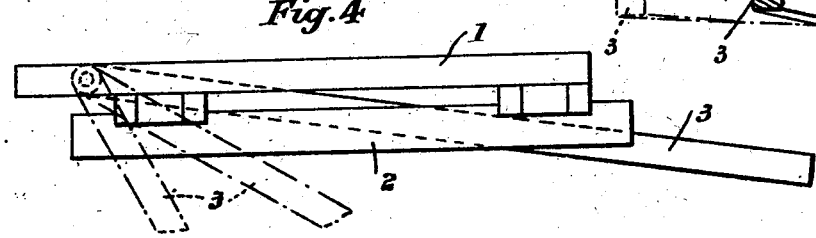
Inventor
ALBERT FREDERICK COATES
by his attorneys
Howson and Howson March 13, 1928.  
A. F. COATES  
1,662,661  
CONTROL MECHANISM  
Filed Aug. 17. 1926 4 Sheets-Sheet 2
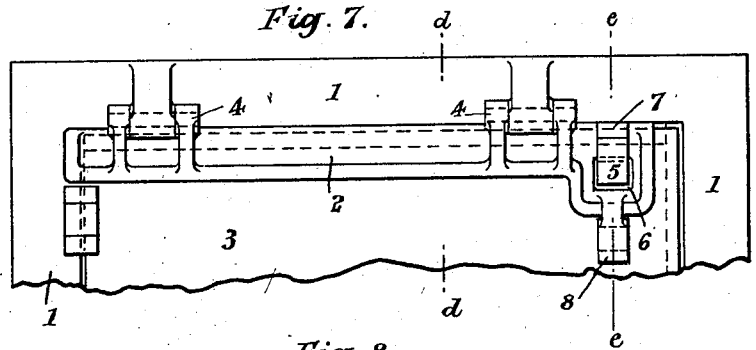
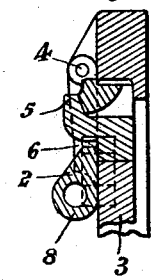
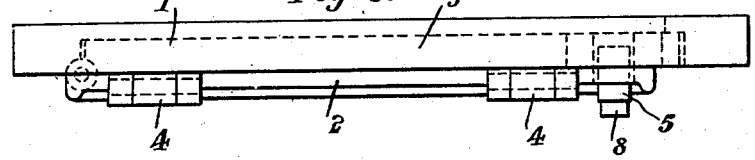
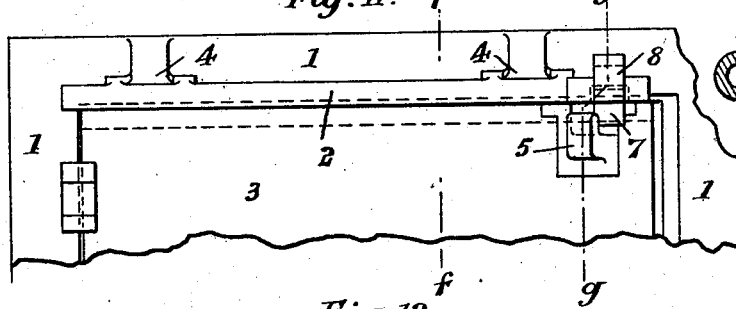
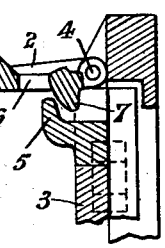
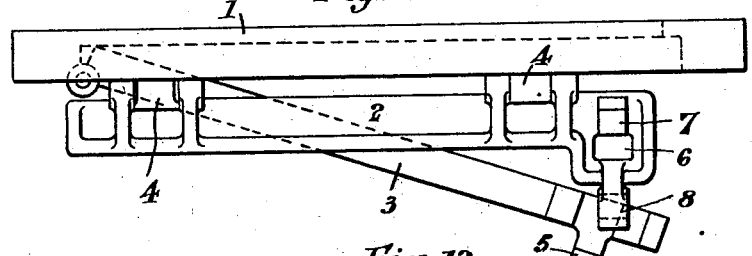
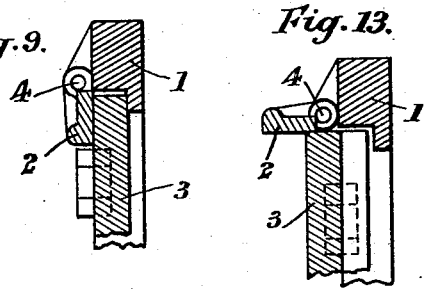
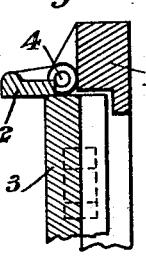
Inventor  
ALBERT FREDERICK COATES  
by his attorneys  
Howson and Howson March 13, 1928. 1,662,661
A. F. COATES
CONTROL MECHANISM
Filed Aug. 17, 1926 4 Sheets-Sheet 3
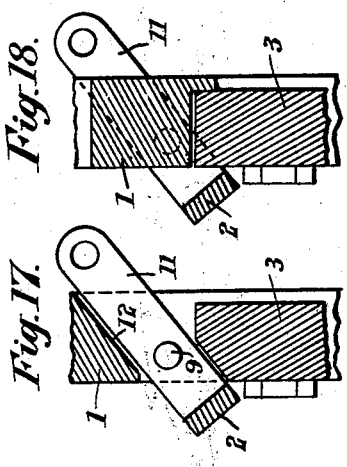
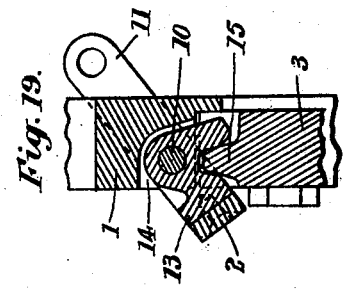
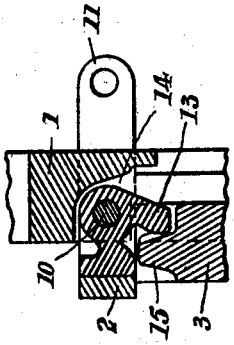
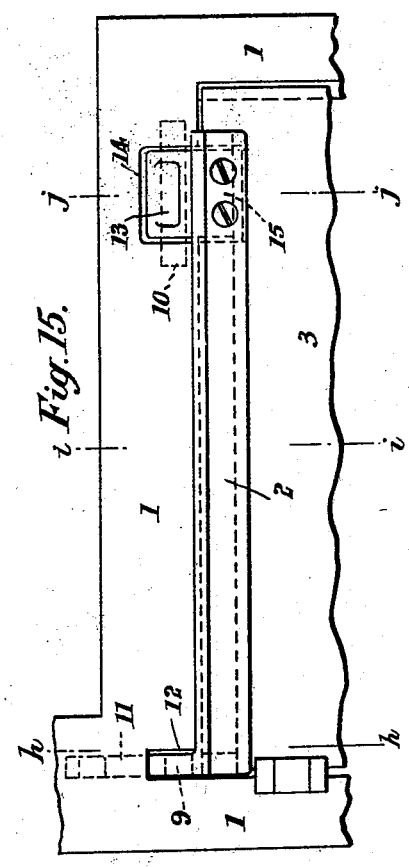
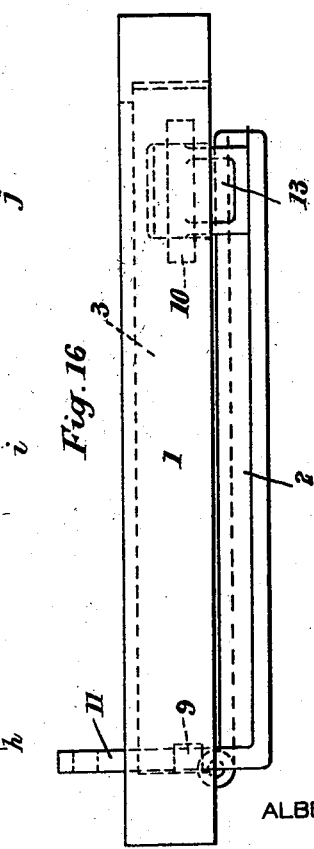
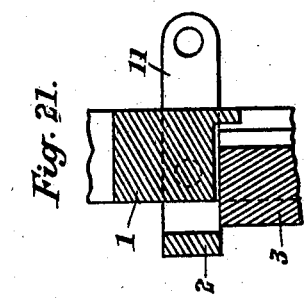
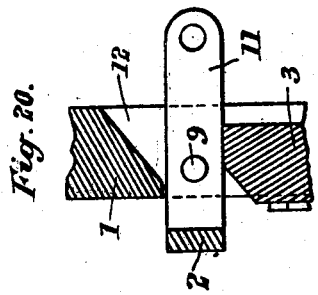
Inventor
ALBERT FREDERICK COATES
by his attorneys
Howson and Howson

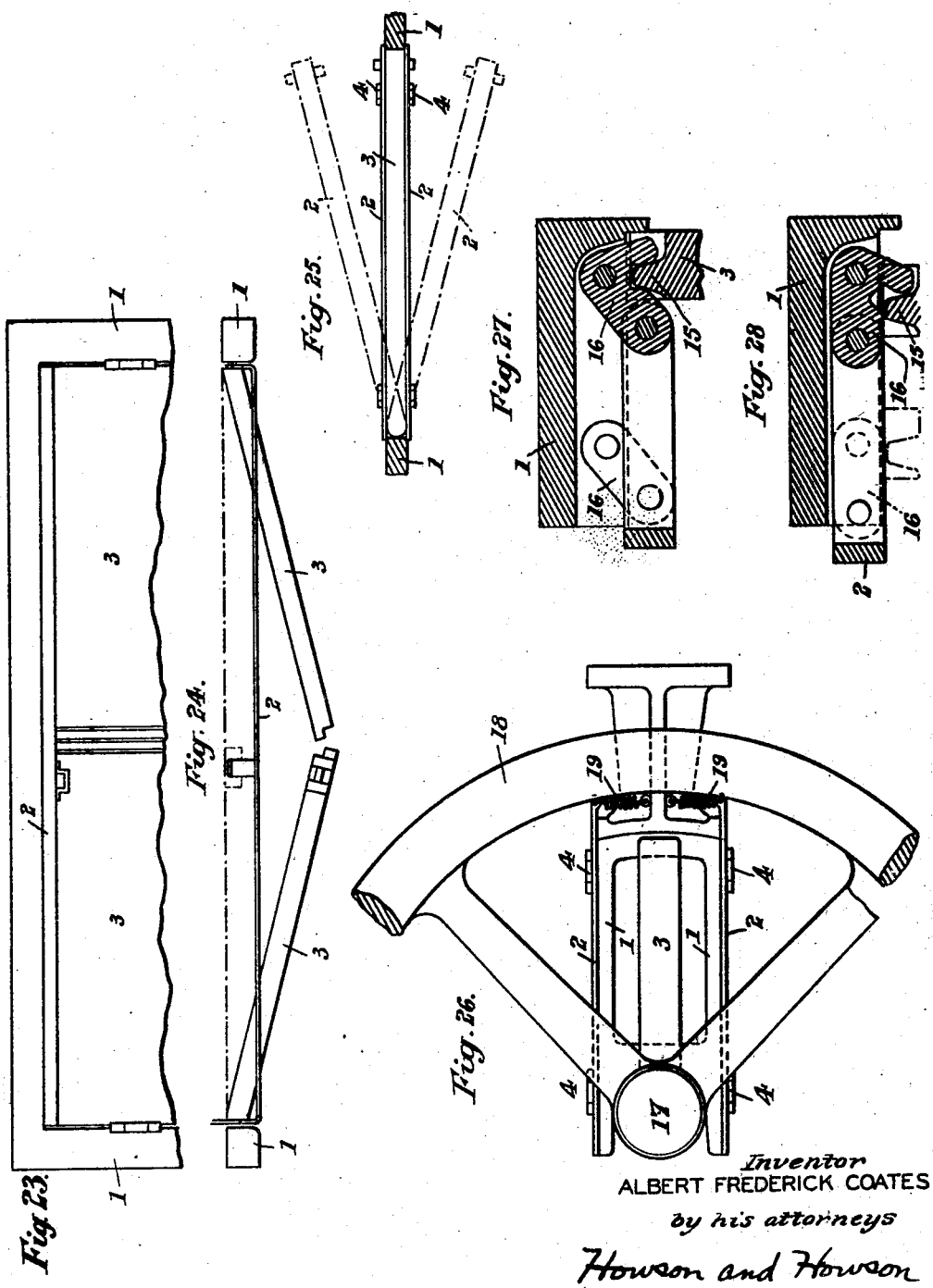

Patented Mar. 13, 1928.

1,662,661

UNITED STATES PATENT OFFICE.

ALBERT FREDERICK COATES, OF BRISTOL, ENGLAND.

CONTROL MECHANISM.

Application filed August 17, 1926, Serial No. 129,750, and in Great Britain August 21, 1925.

This invention has for its object to provide simplified and efficient operating and controlling means applicable for use for example in making and breaking electrical circuits, starting and stopping machines and motive power engines, in controlling the opening of swing doors, lids, or covers of boxes and flaps, the said means being also applicable for use in controlling mechanically or hydraulically, operated mechanism, and mainly consists in providing an operating member pivotally mounted in the path of a movable member appertaining to the apparatus, or device, which it is desired to control, so that when the said movable member is moved it will turn the said operating member on its pivot and operate, for example, a switch whereby an electric circuit is made, or broken, or actuate mechanical means for effecting any desired purpose, such for instance as to cause a driven shaft to be clutched to, or be declutched from, a driving shaft. The arrangement is preferably such that the movable member can be moved to any desired variable extent and when moved to any desired predetermined position will operate to quickly turn the said operating member on its pivot through an unvaried number of degrees and maintain it in that position irrespective of any further movement of the said movable member in the same direction until the said movable member is moved in the opposite direction and when in the position in which it operated to turn the said operating member it will permit the said member to quickly return to its initial position.

I will describe my invention with reference to the accompanying drawings in which Figures 1 and 2 shew in elevation and plan respectively an embodiment of my invention in its simplest form, the said figures shewing the position of the parts when in their closed or inoperative position. Figures 3 and 4 are similar views to Figures 1 and 2 but with the said parts shewn in the position they occupy when in their open, or operative, position. Figures 5 and 6 are sections taken on the lines $a, a$, and $b, b$, Figures 1 and 3 respectively. Figure 7 shews in elevation and Figure 8 in plan operating and controlling means applied to a door and Figures 9 and 10 are sections taken on the lines $d, d$, and $e, e$, respectively Figure 7. In the said Figures 7, 8, 9 and 10 the parts are shewn in the position they occupy when the door is closed. Figures 11 and 12 are similar views to Figures 7 and 8, but with the parts shewn in the position they occupy when the door is open. Figures 13 and 14 are sections taken on the lines $f, f$, and $g, g$, respectively of Figure 11. Figures 15 and 16 shew in elevation and plan respectively a modified arrangement suitable for controlling elevator doors, or operating mechanism, such for example as clutches, in which considerable force may have to be exerted. Figures 17, 18 and 19 are sections taken on the lines $h, h$; $i, i$, and $j, j$, respectively, Figure 15. In the said Figures 15, 16, 17, 18 and 19 the parts are shewn in the position they occupy when closed. Figures 20, 21 and 22 are similar sections to Figures 17, 18 and 19 but shew the parts in the position they occupy when open. Figures 23 and 24 shew in elevation and plan respectively, the application to double doors of an operating member similar to that shewn in the said Figures 15 to 22 inclusive. Figure 25 shews in plan a double swing door, or a lever, having an operating member on each side thereof. Figure 26 shews in plan the application to a steering wheel of an automobile of controlling means in accordance with this invention and Figures 27 and 28 are sections shewing a modified manner of mounting the operating member onto the stationary member and transmitting movement from the said stationary member to the said operating member.

In carrying out the invention in its simplest form (as shewn by way of example in Figures 1 to 6 inclusive) I employ two members 1 and 3 both of which may be turned relatively to one another on a common axis, or one member only may be turned relatively to the other. For the purpose of simplifying description I will presume that the member 1 is stationary and will hereinafter be referred to as the stationary member, and that the member 3 can be turned relatively thereto, preferably to a limited extent; this member will hereinafter be referred to as the movable member. The members 1 and 3 when in their closed, or normal, position lie close to each other in the same plane as shewn in Figures 1, 2 and 5. Hinged transversely to the stationary member 1 is an operating member 2 (such for example as a bar, rod, or its equivalent) so arranged that when the stationary member 1 and the movable member 3 are in their normal, or closed, position the said operating member lies closely against the said movable member, but immediately the movable member is turned on its axis relatively to the said stationary member, or when the said movable member has been turned to a predetermined extent, it turns the said operating member on its axis, as shewn in Figures 3, 4, and 6, to a definite angle relatively to the stationary member with a quick action and thereafter the said operating member 2 bears on the movable member 3 during the latter's further movement so that the operating member 2 is maintained in its turned position until the movable member 3 has returned to the position in which it turned the operating member 2, whereupon the said operating member returns to its normal, or closed, position with a quick movement. The quick movement of the operating member 2 to its open position, its period of rest whilst in the said open position, and its quick return movement to its normal, or closed position are utilized to make and break electric circuits, or to actuate mechanical, or other means, for effecting any desired purpose.

In practice it will be found that the stationary member 1 and the movable member 3 are usually in existence, such for example as a door and its frame, a box and its lid, and the like, in which case the operating member 2 with suitable fittings only have to be provided when it is desired to utilize the opening, or closing, of a door, lid, or the like, to actuate the said operating member. In other cases the movable member 3 only may be in existence, such for example as a hand operable lever, or its equivalent, so that a member fixed relatively to the part constituting the movable member in addition to the operating member must be provided when it is desired to utilize the said part constituting the movable member to actuate the said operating member. It will be understood therefore that in the various applications to which operating and controlling means in accordance with this invention can be used different conditions exist but in each case the principle of the operation of the said means remains the same.

The operating and controlling means is particularly applicable for use in actuating an alarm and lock for single and double doors, casements, flaps, lids of boxes and show-cases and the like; in actuating safety locking devices and alarms for single and double elevator doors; in actuating a safety device, or guard, and alarm for machines, or for hand operable levers, in actuating an indicating device for motor cars, or other road vehicles and for actuating registering and recording apparatus.

In order that my invention may be well understood I will now describe with reference to Figures 7 to 28 inclusive of the accompanying drawings operating and controlling means in accordance with my invention applied to definite articles for effecting various purposes, from which its application to other articles will be readily understood.

Referring to Figures 7, 8, 9, 10, 11, 12, 13 and 14 which shew controlling means in accordance with this invention applied to a swing door, the frame 1 (constituting the stationary member) of the door 3 (constituting the movable member) has an operating member 2, of any suitable length, hinged to its lintel on the opening side of the said door so that it lies vertically against the side of the door when closed, but upon opening the door the upper edge thereof acts to turn the said operating member on its hinges 4 with a quick break action. The operating member is hinged to the door lintel immediately above the latter's edge so that a slight opening of the door will turn the operating member on its axis with a quick movement to full open position. The operating member 2 is maintained in this position by the top horizontal surface of the door 3 (as shewn in Figure 13) which supports it at different parts of its length during the opening of the door to any desired extent and it is retained in the said position until the door is again closed when it returns with a quick movement to its normal, or original vertical, position against the said door, the said return movement being effected either by gravity, or by the action of a spring, or springs, or the equivalent, or positively (as shewn in Figures 7, 8, 10, 11, 12 and 14) by a device 5 which is adapted to engage with the said operating member and lock it in position when the door 3 is closed. This is shewn in Figures 7, 8, 10, 11, 12 and 14 as being effected by an upwardly projecting tooth-like piece 5, which may be integral with the door 3 or it may be an attachment fitted thereto, and is adapted to pass through a hole 6 formed in the operating member 2 and engage a suitably shaped downwardly projecting lug 7 on the said member. When the door 3 is closed the parts will be in the position best shewn in Figure 10. Upon opening the door 3 the operating member 2 will be turned on its hinges 4, into the position best shewn in Figure 14, thereby feeding the tooth-like piece 5 from the hole 6 therein. The operating member 2 is maintained in the position shewn in Figure 14 during the continued turning movement in the same direction of the door 3 until the said door has again returned to the position shewn in Figure 14 whereupon, the tooth-like piece 5 will, upon the further return movement of the said door, engage the lug 7 on the operating member 2 and positively turn the said operating member into the position shewn in Figure 10. The operating member 2 is shewn provided with an arm 8 by which it can be connected to any desired controlling device, which is required to be rendered alternately operative and inoperative upon the outward and inward movements of the door 3. Instead of hinging the operating member 2 to the lintel of the door 3 as aforesaid it may be hinged to the door-sill in which case the said member would lie flat thereon, or on the floor, when the door is opened.

Usually the length of the operating member 2 is such that it will be in operation for the full swing of the door 3 but if desired its length, or position, can be such that it will be actuated at any predetermined portion of the swing of the door. If desired the operating member 2 may be locked in its closed position by a bolt, or its equivalent, thereby constituting an additional locking means to that usually provided. To effect an alarm the arm 8 of the operating member 2 may be connected by any suitable means to a switch so that an electric circuit is established when the door 3 is opened and remains established until the door is again closed or vice versa. The switch may complete the circuit to an electrically operated bell, alarm, or other signal, situated in any desired position. An additional switch may be provided if desired to break the electric circuit and the operating member 2 may operate a registering mechanism adapted to record the number of times the door has been opened or closed, and the length of the periods the door has remained open, or closed.

The modified arrangement shewn in Figures 15, 16, 17, 18, 19, 20, 21 and 22 is more especially applicable for use in apparatus in which considerable power may be required to turn the operating member such for example as when the said member is intended to operate the controlling mechanism of elevator doors, or to operate clutches. In this arrangement the operating member 2 is mounted on pivots 9 and 10 between the lintel of the frame 1 (constituting the stationary member) and the upper edge of the door 3 (constituting the movable member). The operating member 2 may be constituted by a bar having one end bent at right angles to form an arm 11 which is supported by the pivot 9 in an inclined channel 12 formed in the lintel of the frame 1. The arm 11 can be extended as shewn and be adapted to be connected to, and actuate, any desired controlling device upon movement of the said operating member 11. At the other end of the said bar, constituting the operating member 2 or at a suitable intermediate position is secured a lug or toothed segment 13 mounted on the pivot 10 in a recess 14 formed in the lintel of the frame 1, which toothed segment is adapted to be engaged by an upwardly projecting tooth-like piece 15 provided on the door 3. The parts when in their normal, or closed, position would be in the position shewn in Figures 17, 18 and 19. Movement of the door 3 in the direction to open the device causes the tooth-like piece 15 to partially rotate the toothed segment 13 so that the operating member 2 is turned out of the path of the said door as best shewn in Figures 20, 21 and 22. During the further movement of the door 3 in the same direction and also during the return movement of the said door, until it is again in the position shewn in Figure 22, the operating member 2 is maintained out of the path of the said door either by the edge of the toothed segment 13 which is in line with the lower edge of the operating member 2, or by the lower edge of the operating member 2 bearing on the upper edge of the door 3 as best shewn in Figures 21 and 22. When however the door 3 has returned to the position where the tooth-like piece 15 again engages the toothed segment 13, further movement thereof will cause the said toothed segment to partially rotate in the reverse direction and thereby positively turn the operating member 2 from the position shewn in Figure 22 into the normal, or closed, position shewn in Figure 19.

Instead of mounting the operating member 2 on pivots 9 and 10 as shewn in Figures 15 to 22 inclusive so that it moves angularly with respect to the frame 1, it may be carried by links 16 pivoted to the said frame, as shewn in Figures 27 and 28, so that the said operating member moves in a plane parallel with the plane of the said frame. In this arrangement one of the links 16 would be adapted to constitute a toothed segmental piece to be engaged by the upwardly projecting tooth-like piece 15 provided on the movable member 3 as in the arrangement hereinbefore described with reference to Figures 15 to 22 inclusive.

The controlling means described as applied to doors are equally applicable for application to flaps, and lids, or covers, of boxes and show cases and the like and could operate in the same, or substantially the same, manner.

Controlling means in accordance with this invention are especially applicable to single, or double, swing doors of elevators where it is desired to prevent the doors from being opened from either side when the cage is not in proper position opposite the door-opening and also where it is desired to prevent the possibility of the said cage moving before the doors are properly closed and locked.

The controlling means in its simplest form when applied to a pair of elevator swing doors may comprise as shewn in Figures 23 and 24 an operating member 2 hinged to the lintel of the frame 1 of the doors 3 constituting the movable members and spanning their full length when closed. The usual hand operable locking device may be provided on the well, or cage, side of the doors, or to the inside of the lintel. The operating member 2 turns with the opening of the doors in the same manner as hereinbefore described with reference to the preceding figures but has the additional advantage that it cannot be turned to its normal, or original closed, position until both of the swing doors have been properly closed. The operating member 2 may be adapted to operate a switch whereby the electric circuit of the elevator is broken immediately either of the doors is opened and will prevent the circuit being again established until both doors are properly closed. Alternatively, the operating member 2 may be adapted to operate means whereby the locking handle, or handles, is, or are, prevented from operating a switch to complete the electric circuit of the lift until both doors are properly closed. If desired the operating member 2 may prevent the opening of the elevator doors when the cage is not properly opposite the door-opening by suitably connecting it to a locking device with which a fitting on the cage engages when the cage is opposite the said door-opening and releases the said operating member so that it is free to turn and permit of the doors opening, the said device operating, when the cage has moved from the door-opening, to lock the said operating member in its normal, or closed, position and thereby prevents the door being opened.

Controlling means in accordance with my invention when applied to double doors may comprise one, or more than one, operating member and, if desired, two, or more than two operating members may be employed for double swing doors, levers and the like. Figure 25 shews in plan a double swing door 3 (constituting the movable member) having an operating member 2 hinged to each side of the lintel of the frame 1 of the said door, so that one, or the other, of the said operating members will be turned on its hinges 4 according to the direction in which the door is swung.

Controlling means substantially as hereinbefore described as applied to the doors of elevators are applicable also for stopping and re-starting machines provided with a guard when the said guard is turned from and into its protective positions respectively. For this application if the guard of the machine is such that it could not be utilized as the movable member of the controlling device, it would be necessary to provide a guard that could be so utilized. An operating member would then be mounted so as to be actuated by the said guard when turned into, or out of, its protective position, which movement of the said operating member would through electrical, mechanical, or other suitable means, cause the said machine to stop when the guard is turned out of its protective position and prevent the machine being re-started until the said guard is again returned to its normal, or protective position.

The controlling means is also applicable for use in actuating indicators on automobiles and other road vehicles steered by a hand-wheel, or its equivalent, the said indicators being of the kind which are adapted to shew, for example, the direction in which the vehicle is being steered for instance "to the left" or "to the right". This application is shewn in plan in Figure 26 wherein two operating members 2 are hinged to opposite sides of a stationary member 1 radially disposed relatively to the steering post 17 of the vehicle, and secured to and movable with, the said post or to the steering wheel 18 is a movable member 3 which projects between the said two operating members in such manner that when the vehicle is steered to the right the said movable member will turn one of the operating members 2 on its hinges 4 and thereby cause the indicator to display the "to the right" sign and when the vehicle is steered to the left the said movable member will turn the other of the said operating members on its hinges 4 and thereby cause the indicator to display the "to the left" sign, whilst when the vehicle is steered in a straight course the said movable member will be mid-way between the two operating members and neither of the said signs will be displayed. The movable member 3 may be so mounted that it may also be turned by the driver relatively to the steering wheel either to the right or left thus operating the indicator signs independently of the steering wheel. Each operating member 2 may be either electrically, or mechanically, connected to the indicator which may be situated in any suitable position for observation on the vehicle. When an operating member has been turned to operate one, or the other of the signs, it remains in action until the vehicle is steered to run in a straight course, when it returns, preferably by the action of springs 19 as shewn, or by any other equivalent means, to its normal, or inoperative, position.

It is to be understood that the invention is not limited to the precise construction and arrangement of the parts hereinbefore described and illustrated in the accompanying drawings, as it is obvious that modifications may be made without departing from the scope of the invention.

What I claim is:—

1. Control mechanism comprising a stationary member, and a movable member associated with said stationary member, in combination with an operating member pivotally mounted on said stationary member in the path of said movable member, means connected to said operating member adapted through movement of the latter to actuate an associated mechanism, and inter-engaging parts upon said movable member and said operating member, said inter-engaging parts being adapted positively to move said operating member into open position as the movable member begins to move and to hold said operating member in open position during further movement of the movable member, and said inter-engaging parts being also adapted positively to move said operating member into closed position as the movable member ends its movement in the other direction.

2. Control mechanism comprising a door lintel, a door hinged beneath said lintel, an operating member hinged to said lintel on the opening side of said door and lying vertically against the side of the door when closed, and a lug upon said operating member, in combination with a tooth-like piece upon said door adapted to engage with said lug for actuating said operating member, substantially as described.

3. Control mechanism comprising a door lintel, a door hinged beneath said lintel having a horizontal top surface, and an operating member hinged to said lintel immediately above the latter's edge on the opening side of said door and lying vertically against the side of the door when closed, said operating member being adapted to be turned on its axis with a quick movement when the door is moved to its open position and to bear on the horizontal top surface of the door during the latter's further movement to full open position, substantially as described.

4. Control mechanism comprising a door lintel, and a pair of doors hinged beneath said lintel, in combination with an operating member hinged to said lintel on the opening side of said doors and lying vertically against the sides of both doors when closed, said operating member being turned into operating position by the opening of either door and remaining in operating position supported by one door until both doors are closed.

In testimony whereof I have signed my name to this specification.

ALBERT FREDERICK COATES.

CERTIFICATE OF CORRECTION.

Patent No. 1,662,661.                                   Granted March 13, 1928, to

ALBERT FREDERICK COATES.

It is hereby certified that error appears in the printed specification of the above numbered patent requiring correction as follows: Page 2, line 123, for the word "feeding" read "freeing"; and that the said Letters Patent should be read with this correction therein that the same may conform to the record of the case in the Patent Office.

Signed and sealed this 3rd day of April, A. D. 1928.

Seal.

M. J. Moore,
Acting Commissioner of Patents.